(12) United States Patent
Song et al.

(10) Patent No.: US 11,358,223 B2
(45) Date of Patent: Jun. 14, 2022

(54) MULTI-SCALE THREE-DIMENSIONAL PENTAMODE METAMATERIAL AND ADDITIVE MANUFACTURING METHOD THEREOF

(71) Applicant: HUAZHONG UNIVERSITY OF SCIENCE AND TECHNOLOGY, Hubei (CN)

(72) Inventors: Bo Song, Hubei (CN); Junxiang Fan, Hubei (CN); Shuaishuai Wei, Hubei (CN); Yusheng Shi, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/401,334

(22) Filed: Aug. 13, 2021

(65) Prior Publication Data

US 2022/0118518 A1 Apr. 21, 2022

(30) Foreign Application Priority Data

Oct. 16, 2020 (CN) .......................... 202011111080.X

(51) Int. Cl.
*B22F 10/28* (2021.01)
*B33Y 80/00* (2015.01)
*B33Y 10/00* (2015.01)
*C22C 14/00* (2006.01)

(52) U.S. Cl.
CPC .............. *B22F 10/28* (2021.01); *B33Y 80/00* (2014.12); *B22F 2301/205* (2013.01); *B22F 2301/35* (2013.01); *B33Y 10/00* (2014.12); *C22C 14/00* (2013.01)

(58) Field of Classification Search
None
See application file for complete search history.

(56) References Cited

U.S. PATENT DOCUMENTS 10,808,794 B1 * 10/2020 Boyce ........................ F16F 7/08
2016/0167306 A1 * 6/2016 Vidimce ................. G06F 30/00
425/166

\* cited by examiner

*Primary Examiner* — Daniel J. Schleis
(74) *Attorney, Agent, or Firm* — JCIPRNET

(57) ABSTRACT

The disclosure belongs to a technical field related to metamaterials and discloses a multi-scale three-dimensional pentamode metamaterial and an additive manufacturing method thereof. The multi-scale three-dimensional pentamode metamaterial has a body centered cubic (BCC) structure and includes a plurality of rods and a plurality of node structures. Two ends of each of the rods are connected to the node structures. Each of the rods has a cylindrical shape and is provided with a biconical through hole. From one end of the rod towards the other end of the rod, a diameter of the biconical through hole gradually decreases and then gradually increases. A chamber is formed inside each of the node structures, the biconical through hole communicates with the chamber, and the chamber is filled with a lattice structure.

9 Claims, 7 Drawing Sheets

[001]

[110]

MULTI-SCALE THREE-DIMENSIONAL PENTAMODE METAMATERIAL AND ADDITIVE MANUFACTURING METHOD THEREOF

CROSS-REFERENCE TO RELATED APPLICATION

This application claims the priority benefit of China application serial no. 202011111080.X, filed on Oct. 16, 2020. The entirety of the above-mentioned patent application is hereby incorporated by reference herein and made a part of this specification.

BACKGROUND

Technical Field

The disclosure relates to a technical field related to metamaterials, and in particular, relates to a multi-scale three-dimensional pentamode metamaterial and an additive manufacturing method thereof.

Description of Related Art

A pentamode material is a complex fluid with solid characteristics. In an ideal pentamode material, only one of the six eigenvalues of the elastic tensor is non-zero, and the pentamode material may only withstand one stress state. The pentamode material may flow like a fluid in the rest of the stress states and thus may be regarded as a generalized fluid. Water is a common ideal pentamode material because it is difficult for water to be compressed but water may be easily deformed under shear stress. The pentamode materials used in practice usually have water-like properties, that is, the bulk modulus is large but the shear modulus is small. This characteristic is equivalent to the decoupling of the bulk modulus and the shear modulus. Further, the bulk modulus and the shear modulus are closely related to the propagation velocities of the compression waves and shear waves in the material, and may be expressed as:

$$c_B = \sqrt{\frac{B + \frac{4G}{3}}{\rho}}, \quad (1)$$

$$c_G = \sqrt{\frac{G}{\rho}} \quad (2)$$

Herein, $c_B$ and $c_G$ respectively are the wave speed of the compression wave and the wave speeds of the shear wave, B and G respectively are the bulk modulus and shear modulus, and $\rho$ is the density. For an ideal pentamode material, its shear modulus G is 0, so the compression wave velocity may be expressed as $c_B = \sqrt{B/\rho}$, and there is no shear wave. For the actual pentamode material, since the pentamode material is made of a solid material, the shear modulus cannot strictly be 0, but it can be controlled within a small range. The compression wave velocity is much greater than the shear wave velocity, and the characteristic similar to that of the pentamode material is provided. In this way, the pentamode material has a wide range of application prospects in the field of acoustics, and may be used to control sound waves in a wide range.

The pentamode material may be accomplished through structural design. The two-dimensional pentamode material is usually designed to be shaped as a honeycomb, such that the functions of acoustic focusing, acoustic stealth, etc. in the two-dimensional scale may be achieved. The three-dimensional pentamode material is usually designed as a biconical diamond structure. By adjusting the diameters of the thick ends and the thin ends of the conical structure, different bulk moduli and shear moduli may be obtained. Through the analysis of its energy band structure, it can be known that the pentamode material has a single-mode frequency region. That is, in this frequency range, only compression waves may be propagated, and shear waves are cut off, which means that the bulk modulus and shear modulus are decoupled. Nevertheless, conventionally, the biconical three-dimensional pentamode structure mainly has two adjustable parameters, that is, the diameters of the thick ends and the thin ends of the twin cones. The adjustable range is relatively narrow, and for some extreme parameters, this structure may be difficult to be achieved. Further, when the diameters of the thin ends are excessively small, the forming error is large, and it is difficult to achieve the desired effect.

SUMMARY

According to the above technical defects and requirements for improvements found in the related art, the disclosure provides a multi-scale three-dimensional pentamode metamaterial and an additive manufacturing method thereof, where the multi-scale three-dimensional pentamode metamaterial has a body centered cubic (BBC) structure and is formed by node structures and rods, the node structures are configured for adjusting an equivalent density of the pentamode metamaterial, and the rods are mainly configured for adjusting moduli of the pentamode metamaterial. Compared with a conventional biconical three-dimensional pentamode structure, the multi-scale three-dimensional pentamode metamaterial provided by the disclosure introduces a new degree of design freedom, that is, a size of the node structures and a fill rate of internal lattice structures. In this way, the equivalent density may be adjusted without significantly affecting the moduli. By fine-tuning these parameters, characteristic parameters such as the equivalent density and equivalent modulus of a unit cell may be adjusted. Next, unit cells with different characteristic parameters are combined according to a certain rule, and devices with different functions, such as acoustic focusing and acoustic stealth, may be obtained.

To achieve the above purpose, according to an aspect of the disclosure, a multi-scale three-dimensional pentamode metamaterial is provided. The multi-scale three-dimensional pentamode metamaterial has a BCC structure and includes a plurality of rods and a plurality of node structures. Two ends of each of the rods are connected to the node structures.

Each of the rods has a cylindrical shape and is provided with a biconical through hole. From one end of the rod towards the other end of the rod, a diameter of the biconical through hole gradually decreases and then gradually increases. A chamber is formed inside each of the node structures, the biconical through hole communicates with the chamber, and the chamber is filled with a lattice structure.

Further, a central axis of the rod overlaps a central axis of the biconical through hole.

Further, the rods and the node structures form a plurality of multi-scale three-dimensional pentamode metamaterial unit cells. The multi-scale three-dimensional pentamode metamaterial unit cells are connected to one another in an array to form the multi-scale three-dimensional pentamode metamaterial.

Further, each of the multi-scale three-dimensional pentamode metamaterial unit cells is shaped as a cube, and a value range of a side length A of each of the multi-scale three-dimensional pentamode metamaterial unit cells is 1/20 to 1/2 of an operating wavelength.

Further, an outer diameter and a length of each of the rods respectively are D and L. A diameter of a thick end of the biconical through hole is $d_1$, and a diameter of a thin end is $d_2$, where A/20≤D≤A/4 and $d_1 \geq d_2$.

Further, each of the node structures is shaped as a cube, and a value range of a side length a of each of the node structures is A/10 to A/3.

Further, the chamber is shaped as a cube, and a value range of a wall thickness b of the chamber is a/20 to a/8.

Further, a fill rate f of the lattice structure is 0% to 100%. When f is 0, an interior of each of the node structures is hollow and an equivalent density of the lattice structure reaches a minimum. When f is 100, each of the node structures is solid and an effective density reaches a maximum.

According to another aspect of the disclosure, an additive manufacturing method of the multi-scale three-dimensional pentamode metamaterial is provided.

In general, compared with the related art through the above technical solutions conceived by the disclosure, the multi-scale three-dimensional pentamode metamaterial and the additive manufacturing method thereof provided by the disclosure mainly exhibit the following beneficial effects.

1. Compared with the conventional biconical pentamode metamaterials, the abovementioned multi-scale three-dimensional pentamode metamaterial is designed to have a BCC structure. The hollow node structures are introduced at intersections of the rods and are filled with the lattice structures of different volume fractions. In this way, the degree of freedom of design is improved, and the characteristic parameters of the pentamode material may be adjusted in a large range, such that a pentamode material functional component with a strong control ability is obtained.

2. In a conventional biconical pentamode metamaterial, the connection point of the thin end of each of the rods is excessively small. As such, large errors are prone to occur in the manufacturing process, leading to large deviations between the physical model and the design model. In the disclosure, the outer diameters of the rods of the multi-scale three-dimensional pentamode metamaterial are uniform, so that manufacturing errors may be effectively lowered.

3. By adjusting the size parameters of the BCC pentamode material unit cells, a combination of different equivalent moduli and densities may be obtained. By combining these unit cells with different characteristic parameters according to a certain rule, devices with different functions, such as acoustic focusing and stealth, may be obtained.

4. The three-dimensional pentamode metamaterial belongs to a lattice structure with a complex shape, so the use of the additive manufacturing technique may contribute to efficient and accurate preparation of physical devices.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

Figure 1:
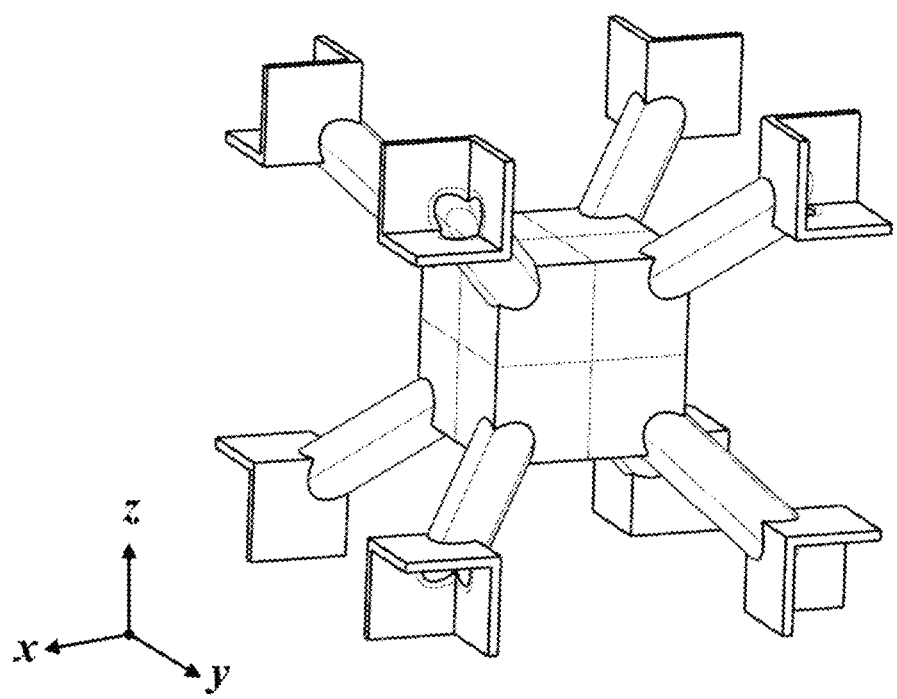
FIG. 1 is a view of a structure of a multi-scale three-dimensional pentamode metamaterial unit cell according to the disclosure.
Figure 2:
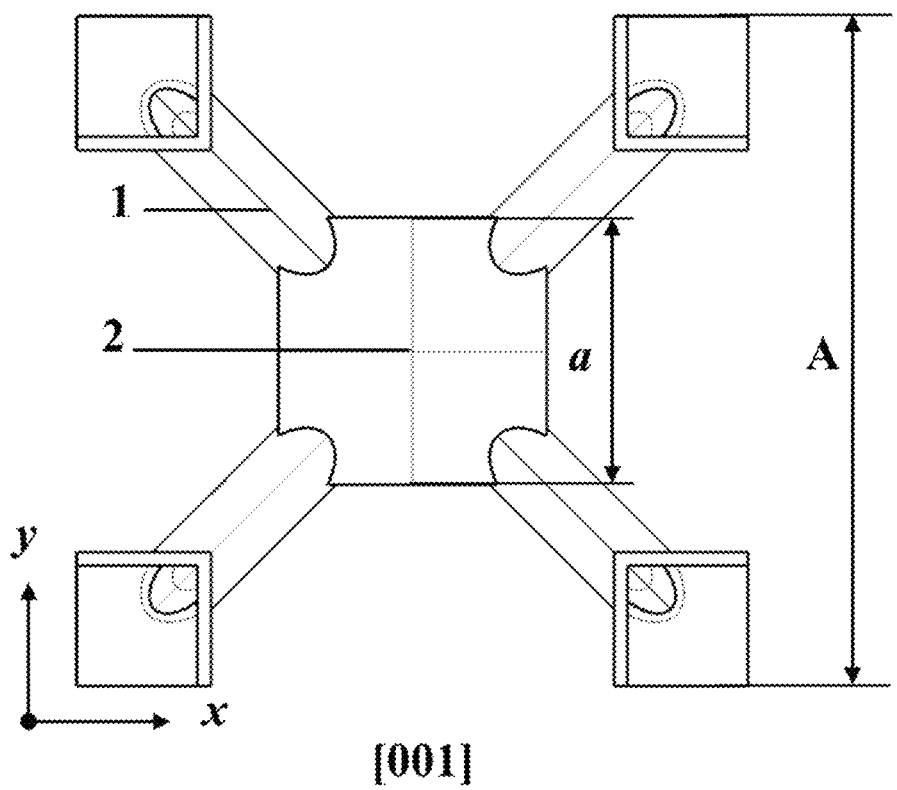
FIG. 2(a), FIG. 2(b), and FIG. 2(c) are schematic views of the structure of the multi-scale three-dimensional pentamode metamaterial unit cell in FIG. 1 taken along different angles.
Figure 2:
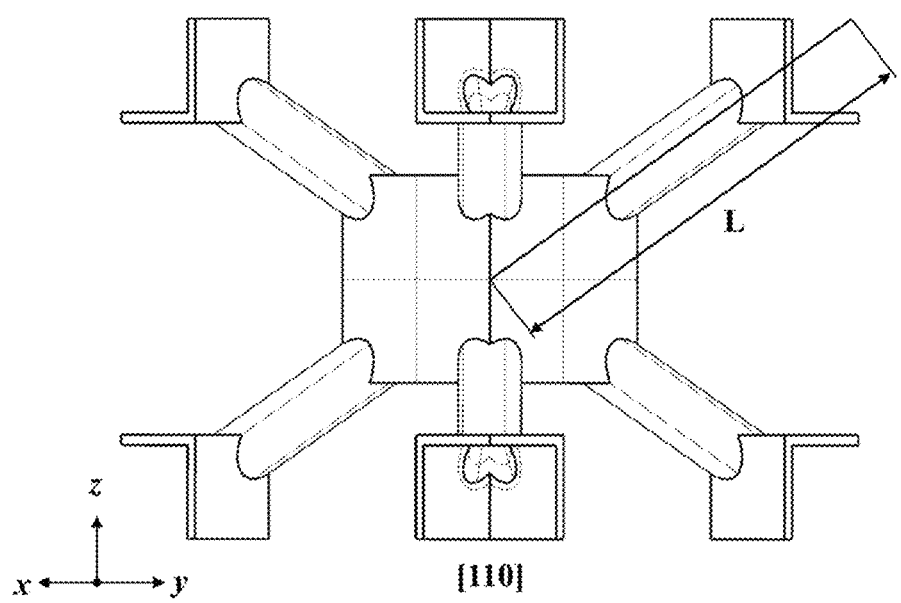
Figure 2:
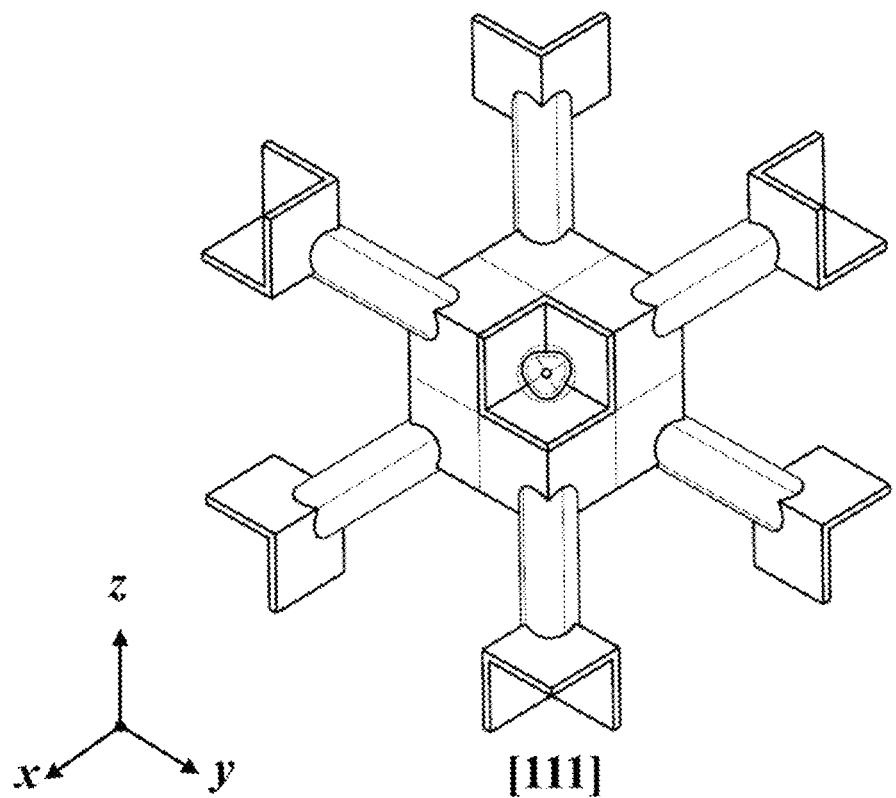
Figure 3:
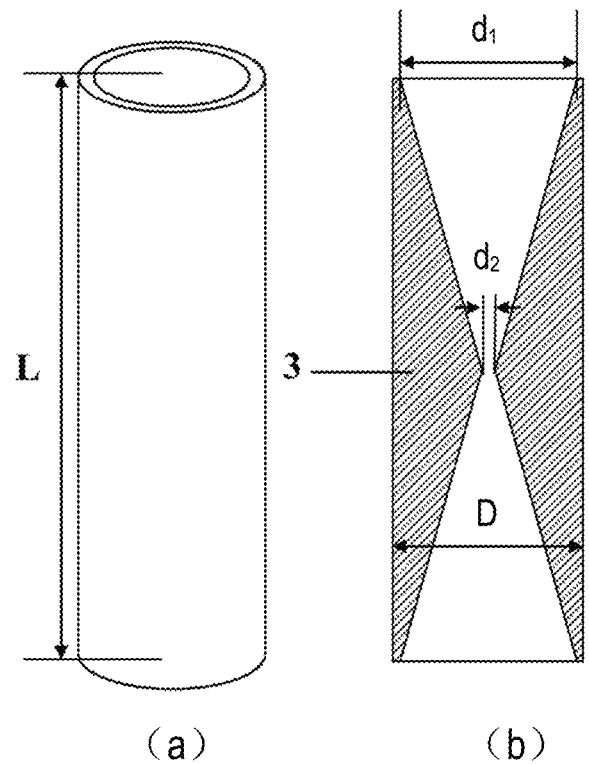

(a) of FIG. 3 and (b) of FIG. 3 respectively are a schematic view and a cross-sectional schematic view of a structure of a rod of the multi-scale three-dimensional pentamode metamaterial unit cell in FIG. 1.

Figure 4:
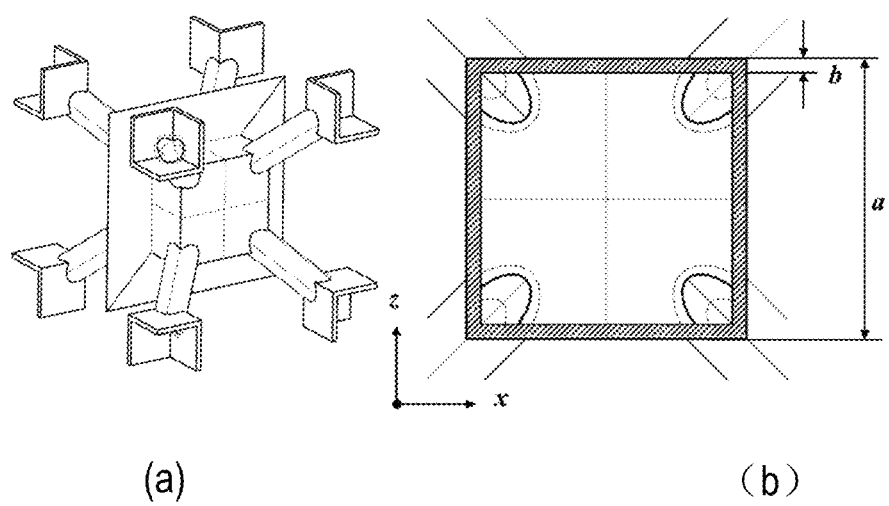

(a) of FIG. 4 and (b) of FIG. 4 respectively are a schematic view and a cross-sectional schematic view of a node structure of the multi-scale three-dimensional pentamode metamaterial unit cell in FIG. 1.

Figure 5:
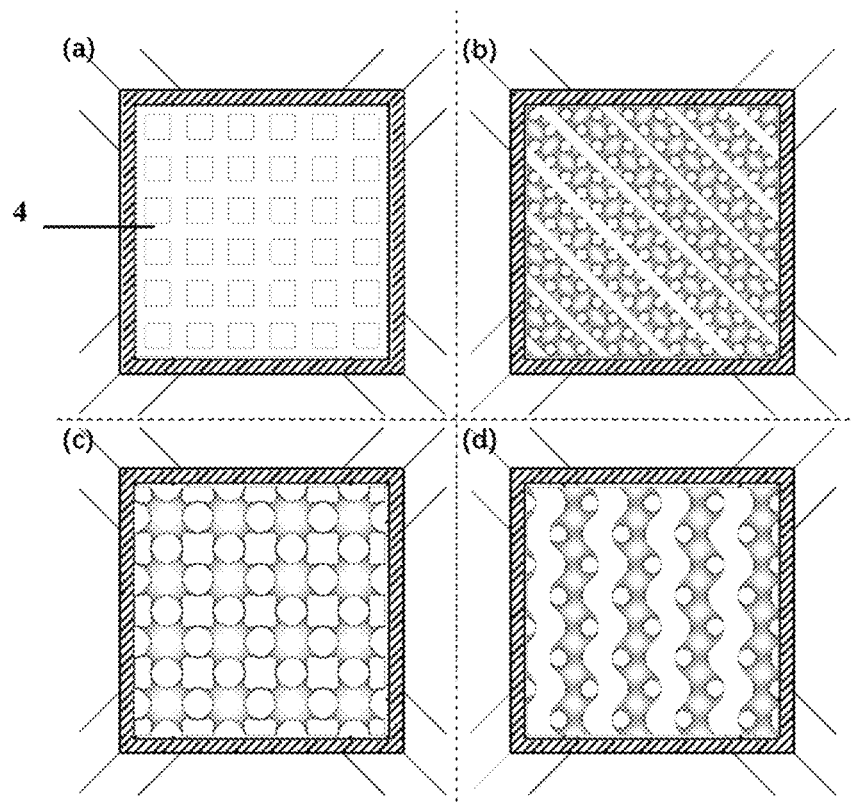

(a) of FIG. 5, (b) of FIG. 5, (c) of FIG. 5, and (d) of FIG. 5 respectively are schematic views of the node structure of the multi-scale three-dimensional pentamode metamaterial unit cell in FIG. 1 filled with different lattice structures.

Figure 6:
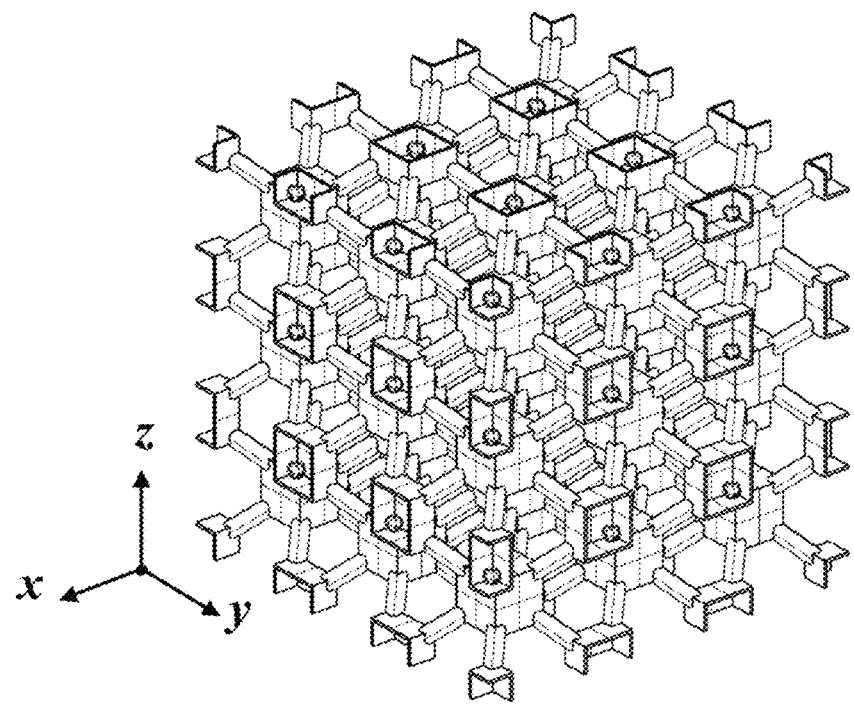

FIG. 6 is a three-dimensional schematic view of a three-dimensional pentamode metamaterial obtained through multi-scale three-dimensional pentamode metamaterial unit cells formed in an array in FIG. 1.

Figure 7:
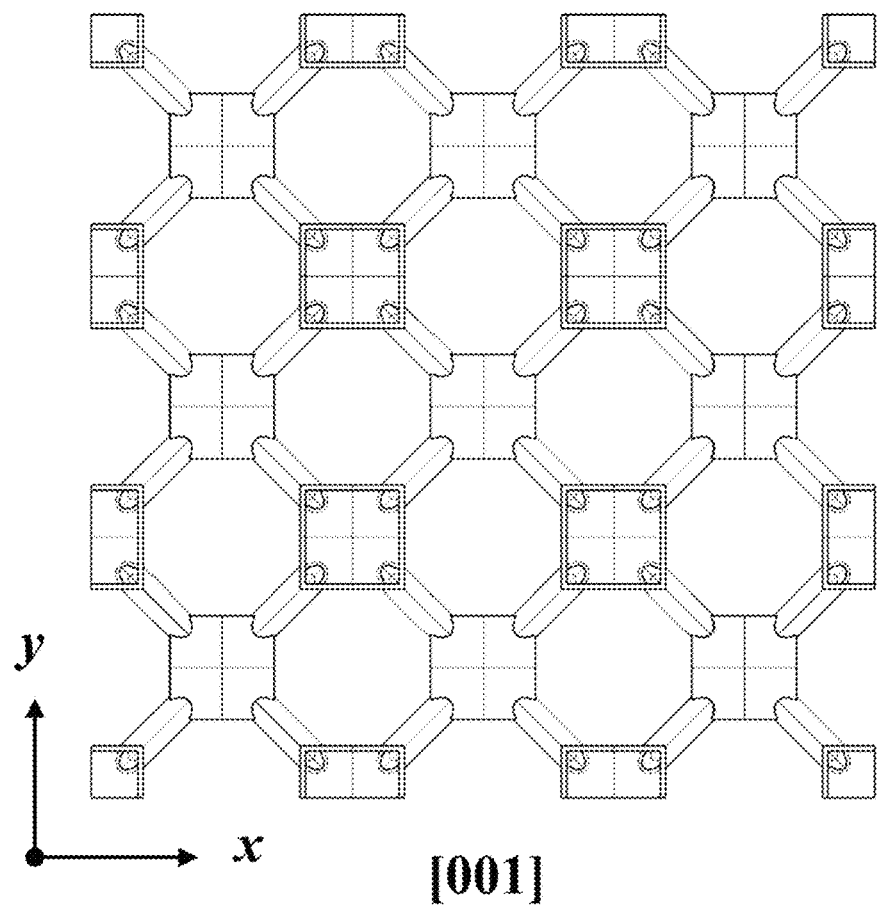
Figure 7:
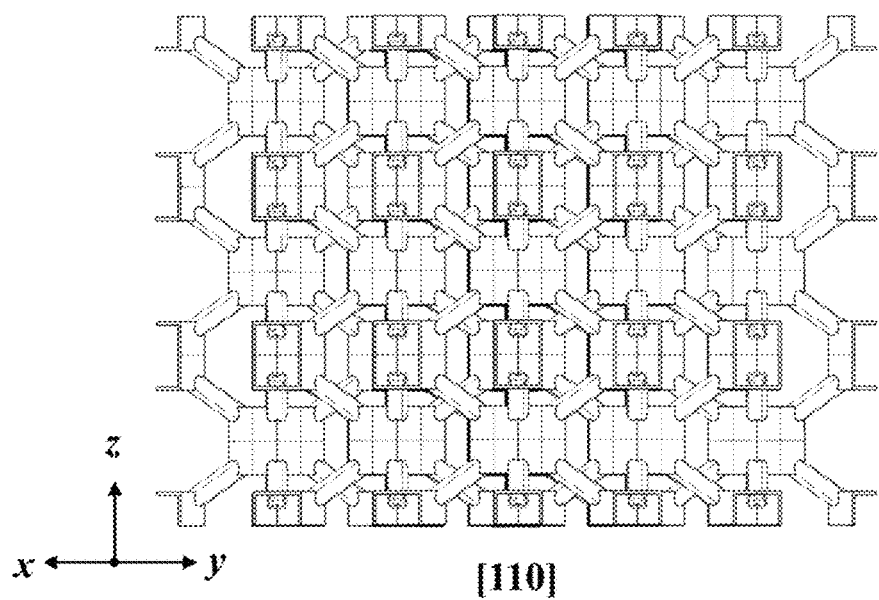
Figure 7:
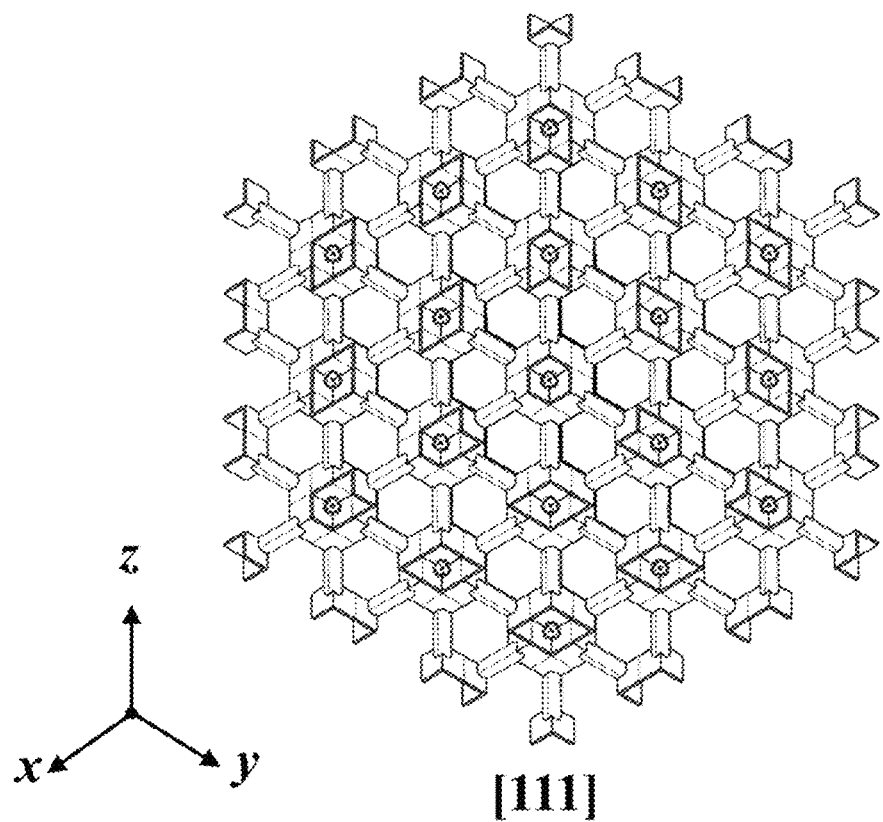

FIG. 7(a), FIG. 7(b), and FIG. 7(c) are schematic views of a structure of the multi-scale three-dimensional pentamode metamaterial in FIG. 6 taken along different angles.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

With reference to FIG. 1 to FIG. 4, through the multi-scale three-dimensional pentamode metamaterial provided by the disclosure, problems such as a small adjustment range and a large forming error found in a conventional biconical three-dimensional pentamode structure may be addressed. The pentamode metamaterial is designed to have a body centered cubic (BCC) structure, and node structures are introduced at junctions of rods. Each of the node structures is designed as a hollow structure, and interiors of the node structures are filled with lattice structures of different volume fractions. A biconical rod-like structure is built into a cylindrical straight rod, so a biconical through hole is provided and is connected to an internal chamber of the node structure. By adjusting various size parameters, unit cells with different combinations of bulk moduli and shear moduli may be obtained. The different unit cells are then combined according to a certain rule, and devices with functions that do not exist in nature, such as acoustic focusing and acoustic stealth, may be obtained.

The multi-scale three-dimensional pentamode metamaterial includes a plurality of multi-scale three-dimensional pentamode metamaterial cell units. The multi-scale three-dimensional pentamode metamaterial unit cells are connected to one another in an array to form the multi-scale three-dimensional pentamode metamaterial. Each of the multi-scale three-dimensional pentamode metamaterial unit cell includes a plurality of rods 1 and a plurality of node structures 2, and one end of each of the rods 1 is connected to one of the node structures 2. Each of the rods 1 has a cylindrical shape and is provided with a biconical through hole 3. From one end of the rod 1 towards the other end of the rod 1, a diameter of the biconical through hole 3 gradually decreases and then gradually increases.

With reference to FIG. 5, FIG. 6, FIG. 7(a), FIG. 7(b), and FIG. 7(c), in the present embodiment, a central axis of the rod 1 overlaps a central axis of the biconical through hole 3. A chamber is formed inside each of the node structures 2, and the chamber communicates with the biconical through hole 3. The chambers are filled with lattice structures 4 of different types.

The rods are mainly used to adjust a ratio of the bulk modulus to the shear modulus. Since an outer diameter of each of the rods is unchanged, the shear modulus is achieved by adjusting a size of the inner biconical through hole. Generally speaking, when a contact area between the rods decreases, connection strength between the rods reduces, and the ratio of the bulk modulus to the shear modulus rises. By reducing the thick end diameters of the biconical through hole, a contact area between the rod and the node structure may be effectively reduced, and a relatively large ratio of the bulk modulus to the shear modulus is thereby obtained. An external macroscopic size of the node structure may also significantly affect the bulk modulus and shear modulus of the pentamode material as well. By changing the size of the node structure, the contact area between the rod and the node structure may change, and that the bulk modulus and shear modulus of the structure are thereby affected. Nevertheless, an internal feature of each of the node structures has little effect on overall physical parameters of the structure. Based on the above, the interior of each of the node structures is designed as a hollow structure and is filled with a lattice structure with a variable volume fraction. By adjusting the volume fraction of the lattice structure, an equivalent density of the multi-scale three-dimensional pentamode metamaterial may be adjusted. Therefore, the moduli and density of the designed multi-scale three-dimensional pentamode metamaterial may be adjusted separately, which greatly improves the degree of freedom of adjustment of structural characteristic parameters.

A model of the design structure is constructed, and simulation software such as COMSOL is then applied to calculate a band structure curve of the design structure. A slope starting from a center of a Brillouin zone is a propagation velocity in different directions in an elastic wave structure. For the pentamode metamaterial, due to its fluid nature, the bulk modulus is much greater than the shear modulus. According to the calculation formula of a propagation velocity of elastic waves, a propagation velocity of compression waves inside the material is much greater than that of shear waves, which is reflected in the band structure curve as: a curvature of the compression waves is much greater than that of the shear waves, and a single-mode frequency region may appear. That is, in a single-mode frequency range, only the compression waves may propagate freely, and the propagation of shear waves is suppressed. This property is consistent with that of fluids. By adjusting the aforementioned size parameters, a ratio of the propagation velocity of the compression waves to the propagation velocity of the shear waves as well as a frequency range of the single-mode region may be adjusted. In the single-mode region, as only the compression waves may propagate and the wave velocity is adjustable, unit cells with different characteristic parameters may be combined, and a device that may freely control the propagation of internal elastic waves may be obtained. In this way, devices with functions that do not exist in nature, such as acoustic focusing and acoustic stealth, may be obtained.

The size parameters of the multi-scale three-dimensional pentamode metamaterial unit cells forming the multi-scale three-dimensional pentamode metamaterial may be different from one another. The multi-scale three-dimensional pentamode metamaterial unit cells include rods and node structures. The rod is a cylindrical straight rod with a biconical hollow structure inside. As shown in FIG. 3, a connecting end of the twin cones has a smaller diameter, and connecting portions between the twin cones and the node structures have larger diameters. Therefore, a porosity of the rod gradually increases from the middle to the two ends. The biconical hollow structure inside the rod has two functions. One function is to adjust a magnitude of a structure modulus by changing the diameters of the thick end and the thin end of the biconical structure. The second function is that a change of the size parameters of the biconical structure may also contribute to adjustment of the equivalent density. Each of the node structures is a hollow structure, the node structures are filled with different types of lattice structures inside, and implementation of multiple scales is thus achieved. By changing the porosity of each of the filled lattice structures, the equivalent density of the three-dimensional pentamode metamaterial may be adjusted without significantly affecting the modulus.

The characteristic parameters such as modulus and density of the multi-scale three-dimensional pentamode metamaterial are directly related to a selected base material, and different materials may be selected for manufacturing according to different application needs. A side length of the multi-scale three-dimensional pentamode metamaterial is A, and a value range is 1/20 to 1/2 of an operating wavelength. When the value decreases, an applicable frequency range expands. An outer diameter and a length of each of the rods respectively are D and L. A diameter of a thick end of the biconical through hole is $d_1$, and a diameter of a thin end is $d_2$, where $A/20 \leq D \leq A/4$ and $d_1 \geq d_2$.

A rod length refers to a distance between a center point to a vertex of the BCC, that is $L=\sqrt{3}/2A$. Each of the node structures is shaped as a cube, a side length is a, and a value range is A/10 to A/3. Each of the node structures is a hollow structure, and the chamber formed inside each of the node structures is also a cube. A wall thickness of each of the node structures is b, a value range is a/20 to a/8, and each of the chambers is filled with a lattice structure.

A fill rate f of the lattice structure is 0% to 100%. When f is 0, the interior of each of the node structures is hollow and an equivalent density of the lattice structure reaches a minimum. When f is 100, each of the node structures is solid, and an effective density reaches a maximum. Since both ends of the biconical through hole are respectively connected to the chamber, pores of the multi-scale three-dimensional pentamode metamaterial are through holes.

The disclosure further provides an additive manufacturing method of a multi-scale three-dimensional pentamode metamaterial. The method is configured to prepare the aforementioned multi-scale three-dimensional pentamode metamaterial. The adopted additive manufacturing method may be a selective laser melting (SLM) technique, a selective laser sintering (SLS) technique, a fused deposition modeling (FDM) technique, or a stereolithography (SLA) technique.

The following examples are provided to further describe the disclosure in detail.

Example 1

When a structure of a three-dimensional pentamode metamaterial is designed, a target modulus and the equivalent density are required to be determined first. An appropriate material is then selected, and the size parameters are constantly modified to achieve a set goal. The specific design steps are provided as follows.

(1) A target bulk modulus B is configured to be 2.25 GPa, an equivalent density ρ is configured to be 1,000 kg/m³, and the ratio of the bulk modulus to the shear modulus is 10. Through such configurations, the pentamode material may have moduli and density similar to that of water.

(2) A Ti6Al4V alloy is selected as the base material for manufacturing the pentamode metamaterial, and since an elastic modulus thereof is 110 GPa and a density thereof is 4,510 kg/m³, a solid fill rate of the designed pentamode matamaterial is 1,000/4,510=0.22.

(3) The side length A of a multi-scale pentamode structure unit cell is configured to be 10 mm, the side length a of each of the node structures is 4 mm, the wall thickness b of each of the node structures is 0.5 mm, and the outer diameter D of each of the rods is 2 mm.

(4) The diameters $d_1$ and $d_2$ of the thick and thin ends of one biconical through hole and the volume fraction f of the lattice structure filled in the chamber of the node structure are given first, and the equivalent density ρ may be obtained. If the equivalent density ρ is greater than 1,000 kg/m³, the volume fraction f is decreased, otherwise, the volume fraction f is increased.

(5) The COMSOL Multiphysics simulation software is used to calculate the band structure curve. According to the slope of the curve, velocities of the compression waves and shear waves in the lattice structure are obtained.

(6) The bulk modulus and shear modulus of the designed pentamode metamaterial are calculated and obtained by using formula (1) and formula (2) and then are compare with a design value. If the calculated bulk modulus is excessively large, $d_1$ is then increased and calculation of the band structure curve continues, otherwise, $d_1$ is decreased and comparison between an obtained result and the design value continues until the obtained result satisfies the needs.

(7) Since a change in $d_1$ and $d_2$ may change the equivalent density of the structure, after the modulus values meet the needs, the equivalent density ρ is calculated again, and adjustment is made according to the method in step (4) until a set value is reached.

(8) A model with adjusted parameters is exported to a STL format, and Ti6Al4V powder is used for forming on a laser selective melting apparatus.

Example 2

The additive manufacturing method of the multi-scale three-dimensional pentamode metamaterial provided by Example 2 of the disclosure mainly includes the following steps.

(1) A target bulk modulus B is configured to be 4.5 GPa, an equivalent density ρ is configured to be 1,500 kg/m³, and the ratio of the bulk modulus to the shear modulus is 15.

(2) 316L stainless steel is selected as the base material for manufacturing the pentamode material, and since an elastic modulus thereof is 210 GPa and a density thereof is 7,900 kg/m³, a solid fill rate of the designed pentamode metamaterial is 1,500/7,900=0.19.

(3) The side length A of a multi-scale three-dimensional pentamode metamaterial unit cell is configured to be 20 mm, the side length a of each of the node structures is 8 mm, the wall thickness b of each of the node structures is 1 mm, and the outer diameter D of each of the rods is 2.5 mm.

(4) The diameters $d_1$ and $d_2$ of the thick and thin ends of one biconical through hole and the volume fraction f of the lattice structure filled in the chamber of the node structure are given first, and the equivalent density ρ may be obtained. If the equivalent density ρ is greater than 1,500 kg/m³, the volume fraction f is decreased, otherwise, the volume fraction f is increased.

(5) The COMSOL Multiphysics simulation software is used to calculate the band structure curve. According to the slope of the curve, velocities of the compression waves and shear waves in the lattice structure are obtained.

(6) The bulk modulus and shear modulus of the designed pentamode metamaterial are calculated and obtained by using formula (1) and formula (2) and then are compare with a design value. If the calculated bulk modulus is excessively large, $d_1$ is then increased and calculation of the band structure curve continues, otherwise, $d_1$ is decreased and comparison between the obtained result and the design value continues until the obtained result satisfies the needs.

(7) Since a change in $d_1$ and $d_2$ may change the equivalent density of the structure, after the modulus values meet the needs, the equivalent density ρ is calculated again, and adjustment is made according to the method in step (4) until a set value is reached.

(8) A model with adjusted parameters is exported to a STL format, and 316L stainless steel powder is used for forming on a laser selective melting apparatus.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A multi-scale three-dimensional pentamode metamaterial, wherein:
   the multi-scale three-dimensional pentamode metamaterial has a BCC structure and comprises a plurality of rods and a plurality of node structures, two ends of each of the rods are connected to the node structures, and the BBC structure is a body centered cubic structure,
   each of the rods has a cylindrical shape and is provided with a biconical through hole, thin ends of two conical holes of the biconical through hole are connected, a chamber is formed inside each of the node structures, the biconical through hole communicates with the chamber, and the chamber is filled with a lattice structure,
   wherein the node structures adjust an equivalent density of the multi-scale three-dimensional pentamode metamaterial, and the multi-scale three-dimensional pentamode metamaterial introduces a new degree of design freedom which is a size of the node structures and a fill rate of the internal lattice structures.

2. The multi-scale three-dimensional pentamode metamaterial according to claim 1, wherein: a central axis of the rod overlaps a central axis of the biconical through hole.

3. The multi-scale three-dimensional pentamode metamaterial according to claim 1, wherein: the rods and the node structures form a plurality of multi-scale three-dimensional pentamode metamaterial unit cells, and the multi-scale three-dimensional pentamode metamaterial unit cells are connected to one another in an array to form the multi-scale three-dimensional pentamode metamaterial.

4. The multi-scale three-dimensional pentamode metamaterial according to claim 3, wherein: each of the multi-scale three-dimensional pentamode metamaterial unit cells is shaped as a cube, and a value range of a side length A of each of the multi-scale three-dimensional pentamode metamaterial unit cells is 1/20 to 1/2 of an operating wavelength.

5. The multi-scale three-dimensional pentamode metamaterial according to claim 2, wherein: an outer diameter and a length of each of the rods respectively are D and L, a diameter of a thick end of one of the two conical holes of the biconical through hole is $d_1$, and a diameter of the thin end is $d_2$, where $A/20 \leq D \leq A/4$ and $d_1 \geq d_2$.

6. The multi-scale three-dimensional pentamode metamaterial according to claim 2, wherein: each of the node structures is shaped as a cube, and a value range of a side length a of each of the node structures is A/10 to A/3.

7. The multi-scale three-dimensional pentamode metamaterial according to claim 6, wherein: the chamber is shaped as a cube, and a value range of a wall thickness b of the chamber is a/20 to a/8.

8. The multi-scale three-dimensional pentamode metamaterial according to claim 1, wherein: a fill rate f of the lattice structure is 0% to 100%, an interior of each of the node structures is hollow and an equivalent density of the lattice structure reaches a minimum when f is 0, and each of the node structures is solid and an effective density reaches a maximum when f is 100.

9. An additive manufacturing method of the multi-scale three-dimensional pentamode metamaterial according to claim 1.

* * * * *